Aug. 13, 1946.   H. M. KESTERTON   2,405,699
CONTROLLING MEANS FOR VARIABLE SPEED POWER TRANSMISSION MECHANISMS
Filed Sept. 13, 1945
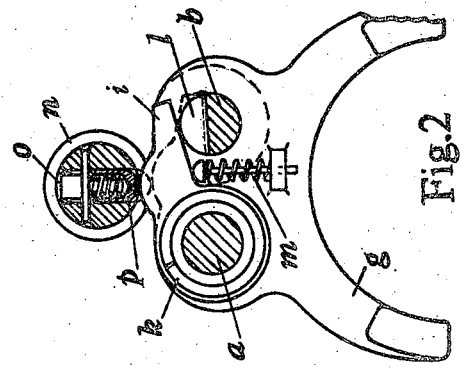
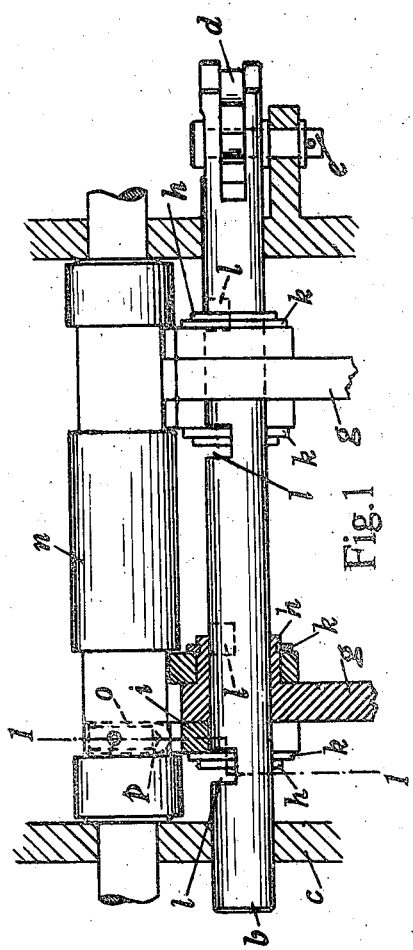
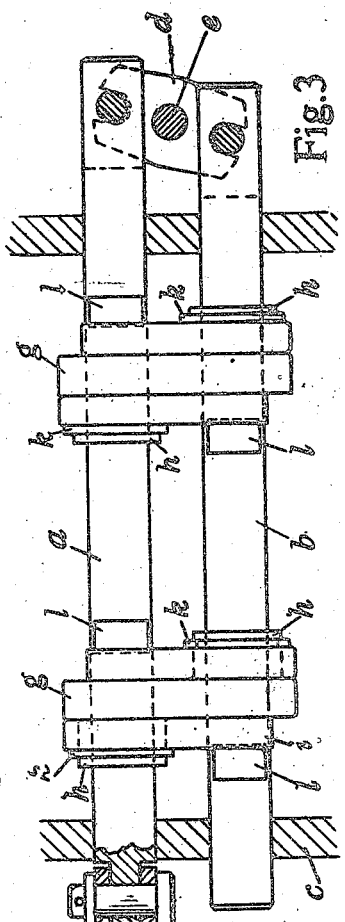
Inventor
H. M. Kesterton Patented Aug. 13, 1946

2,405,699

UNITED STATES PATENT OFFICE 2,405,699

CONTROLLING MEANS FOR VARIABLE-SPEED POWER TRANSMISSION MECHANISMS

Henry Martin Kesterton, Wroxall, near Warwick, England

Application September 13, 1945, Serial No. 616,013
In Great Britain November 17, 1944

2 Claims. (Cl. 74—473)

This invention relates to variable speed power transmission mechanisms as employed on road and other vehicles and machinery of various forms. The object of the invention is to provide improved means for controlling such mechanisms.

The invention comprises the combination of a pair of slidable members arranged parallel with each other and so interconnected that axial movement of one of them in either direction is accompanied by axial movement of the other in the opposite direction, gear changing members slidably mounted on the said slidable members, key pieces on the gear changing members adapted to be engaged with the slidable members at appropriate positions, and a rotatable selection member adapted to actuate the key pieces.

In the accompanying sheet of explanatory drawings—

Figure 1 is a part sectional side elevation, and Figure 2 a sectional end elevation on the line I—I (Figure 1) illustrating one embodiment of the invention.

Figure 3 is a plan with the selection member omitted.

In applying the invention as shown to a four-speed gear box for a road vehicle, I employ a pair of slidable members $a$, $b$ each in the form of a cylindrical or other bar, these being arranged parallel with each other and adapted to be carried by the gear box casing $c$. At one end of these members are interconnected by a short lever $d$ pivoted on the casing by a pin $e$, the connection being such that axial movement of one of the members in either direction is accompanied by a like movement of the other member in the opposite direction. At one end one of the said members is adapted to be connected, as by a link $f$, to the pedal which controls the usual clutch located between the engine and the gear box.

On the two slidable members $a$, $b$ are slidably mounted a pair of gear changing members $g$. These may be in the form of forks adapted to impart sliding movements to clutches associated with the gears. Each gear changing member $g$ is carried by both of the said slidable members $a$, $b$ and is formed with a pair of bosses $h$ through which the said members pass, and on each boss is pivotally carried a key piece $i$ which is conveniently in the form of a short lever arranged to extend across the adjacent slidable member, the key piece being held on its boss $h$ by a spring ring $k$. In the slidable members $a$, $b$ are formed suitably disposed transverse notches $l$ with which the key pieces can be engaged, each such piece being normally held clear of its associated notch by any conveniently arranged spring as $m$ (Figure 2).

Centrally above and parallel with the two interconnected slidable members $a$, $b$ is mounted a rotatable selection member $n$. This is intended to be operable by the driver either directly or through any convenient mechanism. In the form illustrated the selection member $n$ comprises a cylindrical body which is supported at its ends by the gear box casing $c$, and is formed with a pair of circumferential grooves $o$ at positions corresponding to the positions of the gear changing members $g$. The width of each groove is such that it can span a pair of associated key pieces $i$, and in each of the grooved parts of the selection member are mounted a pair of spring-loaded plungers $p$. The relative disposition of the various plungers is such that by rotation of the selection member any one of them can be brought into its operative position over the associated key piece. To avoid confusion in the drawing only one such plunger has been shown, but it will be understood that a similar plunger is mounted in suitable relation to the other plungers over each key piece.

The arrangement is such that when it is required to effect a speed change, the driver rotates the selection member $n$ to the appropriate position. This has the effect of causing the appropriate plunger $p$ to exert pressure on the corresponding key piece $i$. On release of the engine clutch the slidable members are thereby moved, and (assuming the control mechanism to be initially in the neutral position) the notches $l$ are brought adjacent to the key pieces. The key piece which is under the action of the selected plunger is now pressed by the plunger into engagement with its notch, and when the engine clutch is re-engaged, the consequential movement of the slidable member causes the member which is engaged by a key piece to give the required movement to the associated gear changing member $g$. In this action the operative key piece is carried away fom the adjacent groove $o$ in the selection member $n$ to a position in which it is retained by that member in engagement with the slidable member. So long as no further change of gear is required, subsequent actuation of the engine clutch merely brings all the parts to their initial relative positions, and causes the operative key piece to re-engage its slidable member when the clutch is re-engaged. But to effect a change of gear the selection member is moved to the appropriate position, and on actuation of the engine clutch the desired change is effected automatically as above described.

By means of this invention the control of variable speed transmission mechanisms, and especially mechanisms of the synchromesh type can be effected in a very convenient manner. The invention is not, however, restricted to use with vehicle gear boxes as it may be applied to other analogous uses. Moreover the invention is not restricted to the example described as subordinate details may be modified to suit different requirements.

Having thus described my invention what I claim as new and desire to secure by Letters Patent is:

1. Controlling means for variable speed power transmission mechanisms, comprising the combination of a pair of slidable members arranged parallel with each other and so interconnected that axial movement of one of them in either direction is accompanied by axial movement of the other in the opposite direction, gear changing members slidably mounted on the said slidable members, key pieces on the gear changing members adapted to be engaged with the slidable members at appropriate positions, and a rotatable selection member adapted to actuate the key pieces.

2. Controlling means for variable speed power transmission mechanisms, comprising the combination of a pair of notched slidable members arranged parallel with each other, a lever interconnecting one pair of adjacent ends of the said members so that axial movement of one of them is accompanied by opposite axial movement of the other, one of the said members being adapted for connection to the normal actuating means of the clutch associated with the power transmission mechanism, gear changing members slidably mounted on the said slidable members, a pair of key pieces pivotally mounted on each gear changing member, one of them being adapted to be engaged with a notch in one of the slidable members and the other being adapted to be engaged with a notch in the other slidable member, springs for holding the key pieces in their inoperative positions, a rotatable cylindrical selection member operable under the control of the driver and mounted parallel with the slidable members, the selection member having circumferential grooves each of which spans a pair of associated key pieces, and spring loaded plungers carried by the selection member and mounted in appropriate relative positions adjacent to the key pieces, the parts being adapted to co-operate substantially as described.

HENRY MARTIN KESTERTON.